United States Patent [19]

Brennecke et al.

[11] Patent Number: 5,181,266

[45] Date of Patent: Jan. 19, 1993

[54] FIBER OPTICAL WAVEGUIDE HAVING AN ELECTRICALLY CONDUCTIVE CONNECTION

[75] Inventors: Hermann Brennecke, Darmstadt/Eberstadt; Horst Liere, Eppertshausen, both of Fed. Rep. of Germany

[73] Assignee: Alfo AG, Muntelier, Switzerland

[21] Appl. No.: 849,260

[22] Filed: Mar. 11, 1992

[30] Foreign Application Priority Data

Mar. 28, 1991 [DE] Fed. Rep. of Germany ....... 4110279

[51] Int. Cl.$^5$ .............................................. G02B 6/44
[52] U.S. Cl. ...................................... 385/78; 385/101; 385/115
[58] Field of Search ..................... 385/78, 84, 76, 77, 385/115, 123, 126, 127, 128, 101

[56] References Cited

U.S. PATENT DOCUMENTS

| | | | |
|---|---|---|---|
| 4,418,984 | 12/1983 | Wysocki et al. | 385/128 |
| 4,525,026 | 6/1985 | Elion | 385/128 |
| 4,733,933 | 3/1988 | Pikulski | 385/128 |

FOREIGN PATENT DOCUMENTS 0146845  7/1985  European Pat. Off. .

OTHER PUBLICATIONS

Helmut G. Haad, DE-Z Lichtwellenleiter Phasenseil-luftkabel, etz. Bd. 108, 1987, Heft 5, pp. 170-172.

Primary Examiner—Frank Gonzalez
Attorney, Agent, or Firm—Edwin E. Greigg; Ronald E. Greigg

[57] ABSTRACT

The invention relates to an optical wave guide having at least one optical fiber, a protective sheath and connection fittings at the ends. In order for charges entering by diffusion to be dissipated from the surface of the optical fibers, the fibers have an electrically conductive coating which in turn is connected to the connecting fitting and/or to ground.

13 Claims, 1 Drawing Sheet

FIBER OPTICAL WAVEGUIDE HAVING AN ELECTRICALLY CONDUCTIVE CONNECTION

BACKGROUND OF THE INVENTION

The invention relates to a fiber optical wave guide having at least one optical fiber, a protective sheath, and connection fittings at the ends.

Fiber optical wave guides are used in communications technology and measurement technology to conduct electromagnetic waves, particularly in the visible and near infrared spectral range, where they are distinguished by low damping factors. Their installation is done via standardized connection fittings; the optical fibers are retained in the fitting by means of an adhesive or a sealing compound. Because of the insulating properties of the optical fibers, which are of quartz, glass or plastic, the optical wave guides can be connected even to parts that carry voltage, without requiring additional protective provisions, if the protective sheath is embodied as suitably insulating.

Experiments by the present applicant have unexpectedly shown that despite the insulating properties of the optical wave guides, charge transfers can occur. For normal electronic applications, which operate in the microampere range, this is no problem. However, highly sensitive electronic circuits do exist in which such local charges can cause interference.

OBJECT AND SUMMARY OF THE INVENTION

With these findings as a point of departure, the object of the present invention is to improve the known optical wave guides in such a way that local charges are precluded, even if the optical wave guides are exposed to high voltage.

According to the invention, this object is attained in that the optical fiber or fibers, over at least a portion of their circumference, have an electrically conductive connection for dissipating charges entering by diffusion.

This has the advantage that the optical fibers can be kept absolutely charge-free, at least locally in their region at risk, and that because of the electron conduction, ascertained by the present applicant, the adjoining regions of the optical fibers also remain at low potential because any possible charge flows gradually out.

A particularly favorable further feature of the invention is to provide for the charge carriers to be carried away from the optical fibers in the region of the connection fittings. To this end, the filling material previously typically used to join the optical fibers to their connection fittings is replaced by an electrically conductive material.

If the optical wave guide comprises a bundle of numerous individual optical fibers, then according to the invention it is assured that the individual fibers are spaced apart at least locally from one another, far enough that each individual fiber comes into contact with the electrically conductive filler. This assures that each fiber is discharged via its ground connection.

A metal is suitably used as the electrically conductive filler. If the optical fibers ar of plastic, then a conductive plastic or a metal with a low melting point should be selected, the melting point of which is lower than that of the plastic.

In order that the electrons will be reliably carried away from the surface of the glass fibers, it is recommended that the optical fibers be connected to ground via the aforementioned electrically conductive connection.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
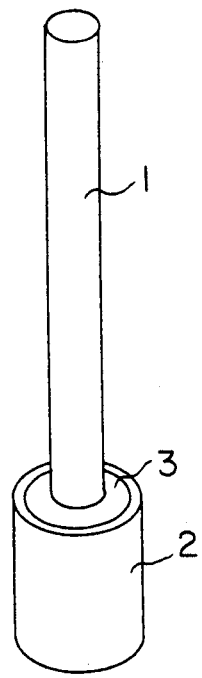
FIG. 1 shows the end of a fiber optical wave guide with a single optical fiber.

In FIG. 1, an optical fiber 1, the protective sheath of which has not been shown for the sake of simplicity, runs with its end coaxially into a connection fitting 2. The connection fitting comprises a cylindrical sleeve, but it may have any other shape instead.

An essential feature is that an annular gap be present between the optical fiber 1 and the fitting 2; this gap is filled with an electrically conductive material, metal or a conductive plastic. In this way, an electrical connection is established between the optical fibers and the connection fitting; the optical fiber connected to ground either directly or via the connecting fitting 2, if the latter is of metal.

Figure 2:
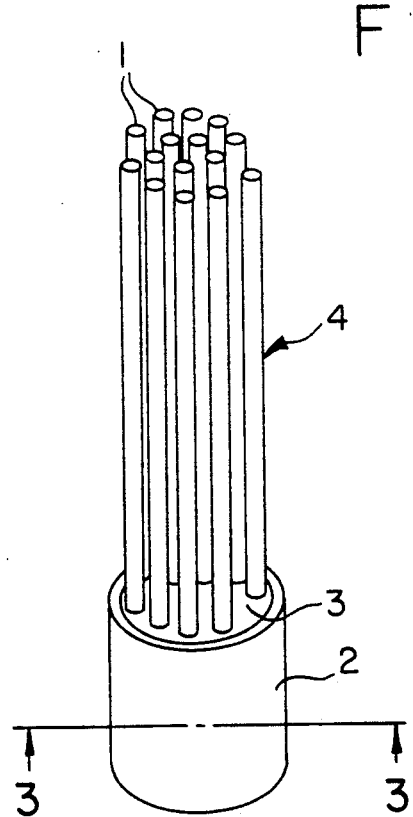
FIG. 2 shows the end of an optical wave guide having a bundle of fibers.
Figure 3:
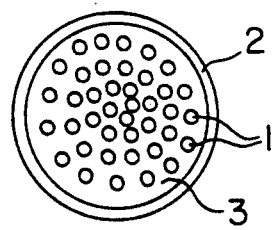
FIG. 3 is a section taken along the line 3—3 of FIG. 2.

FIG. 2 is a corresponding view for a bundle 4 of numerous optical fibers 1. Especially from the sectional view of FIG. 3, it can thus be seen that the individual fibers are spaced apart from one another far enough that even the fibers on the inside are connected to the electrically conducting material 3 and electrically to the connecting fitting.

Typically, the optical fibers are optically coated on their surface. If the coating is not itself electrically conductive then this coating must be removed at least locally before the electrically conductive filler material is introduced.

In both exemplary embodiments, the electrical connection material 3 directly engaging the circumference of the optical fibers assures that any charges that may arise will be dissipated from all the fibers before a dangerously high voltage potential develops.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A fiber optical wave guide having a bundle (4) including a plurality of optical fibers (1) spaced apart locally with connection fittings (2) at opposite ends of said bundle, a filler of an electrical connection material (3) is in electrical contact with at least a portion of each of said plurality of fibers for dissipating electrical charges entering by diffusion, and a protective sheath surrounds said bundle of fibers and extends along a length of said bundle between said connection fittings.

2. An optical wave guide as defined by claim 1, in which the electrical connection material (3) is disposed between the connection fitting (2) and the optical fibers (1).

3. An optical wave guide as defined by claim 1, in which the electrical connection material (3) comprises an electrically conductive filler.

4. An optical wave guide as defined by claim 2, in which the electrical connection material (3) comprises an electrically conductive filler.

5. An optical wave guide as defined by claim 1, in which the filler is a metal, and in the case of plastic optical fibers is a metal with a low melting point.

6. An optical wave guide as defined by claim 2, in which the filler is a metal, and in the case of plastic optical fibers is a metal with a low melting point.

7. An optical wave guide as defined by claim 3, in which the filler is a metal, and in the case of plastic optical fibers is a metal with a low melting point.

8. An optical wave guide as defined by claim 4, in which the filler is a metal, and in the case of plastic optical fibers is a metal with a low melting point.

9. An optical wave guide as defined by claim 1, in which the electrical connection material (3) is connectable to at least one end cap which provides a ground.

10. An optical wave guide as defined by claim 2, in which the electrical connection material (3) is connectable to at least one end cap which provides a ground.

11. An optical wave guide as defined by claim 3, in which the electrical connection material (3) is connectable to at least one end cap which provides a ground.

12. An optical wave guide as defined by claim 4, in which the electrical connection material (3) is connectable to at least one end cap which provides a ground.

13. An optical wave guide as defined by claim 5, in which the electrical connection material (3) is connectable to at least one end cap which provides a ground.

* * * * *

UNITED STATES PATENT AND TRADEMARK OFFICE
CERTIFICATE OF CORRECTION

PATENT NO. : 5,181,266
DATED : January 19, 1993
INVENTOR(S) : Hermann Brennecke et al It is certified that error appears in the above-identified patent and that said Letters Patent is hereby corrected as shown below:

Column 1, line 62, should read as follows:
--filler.  If the optical fibers are of plastic,
  then a conductive--.

Signed and Sealed this

Twenty-third Day of November, 1993

Attest:

BRUCE LEHMAN

*Attesting Officer*     *Commissioner of Patents and Trademarks*